United States Patent [19]
Jaasma

[11] Patent Number: 6,067,972
[45] Date of Patent: May 30, 2000

[54] FUEL INJECTION DEVICE FOR AN INTERNAL COMBUSTION ENGINE

[75] Inventor: Servatius Alfons Maria Jaasma, TE Eindhoven, Netherlands

[73] Assignee: Vialle B.V., Eindhoven, Netherlands

[21] Appl. No.: 09/254,237

[22] PCT Filed: Sep. 2, 1997

[86] PCT No.: PCT/NL97/00502

§ 371 Date: Apr. 8, 1999

§ 102(e) Date: Apr. 8, 1999

[87] PCT Pub. No.: WO98/10186

PCT Pub. Date: Mar. 12, 1998

[30] Foreign Application Priority Data

Sep. 2, 1996 [NL] Netherlands ............................ 1003941

[51] Int. Cl.[7] .................................................. F02M 31/00
[52] U.S. Cl. ........................... 123/549; 123/557; 123/575
[58] Field of Search ..................... 123/549, 557, 123/575, 576, 276 E

[56] References Cited

U.S. PATENT DOCUMENTS

| | | | |
|---|---|---|---|
| 3,999,525 | 12/1976 | Stumpp et al. | 123/549 |
| 4,898,142 | 2/1990 | Van Wechem et al. | 123/549 |
| 5,054,458 | 10/1991 | Wechem et al. | 123/549 |
| 5,284,117 | 2/1994 | Akase | 123/549 |
| 5,850,822 | 12/1998 | Romann et al. | 123/549 |
| 5,873,354 | 2/1999 | Krohn et al. | 123/549 |
| 5,894,832 | 5/1999 | Nogi et al. | 123/549 |

*Primary Examiner*—Marguerite McMahon
*Attorney, Agent, or Firm*—Young & Thompson

[57] ABSTRACT

The fuel used, such as LPG, evaporates at raised temperature. It is proposed that when the internal combustion engine is not running a part of the fuel supply pipes should be heated, so that the liquid fuel therein evaporates. When injectors leak only vaporous liquid will then enter the combustion chamber.

8 Claims, 1 Drawing Sheet

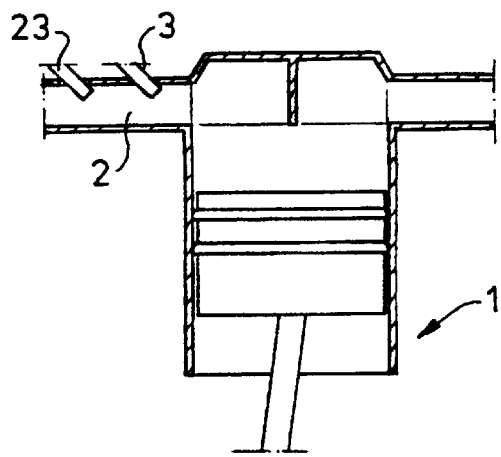
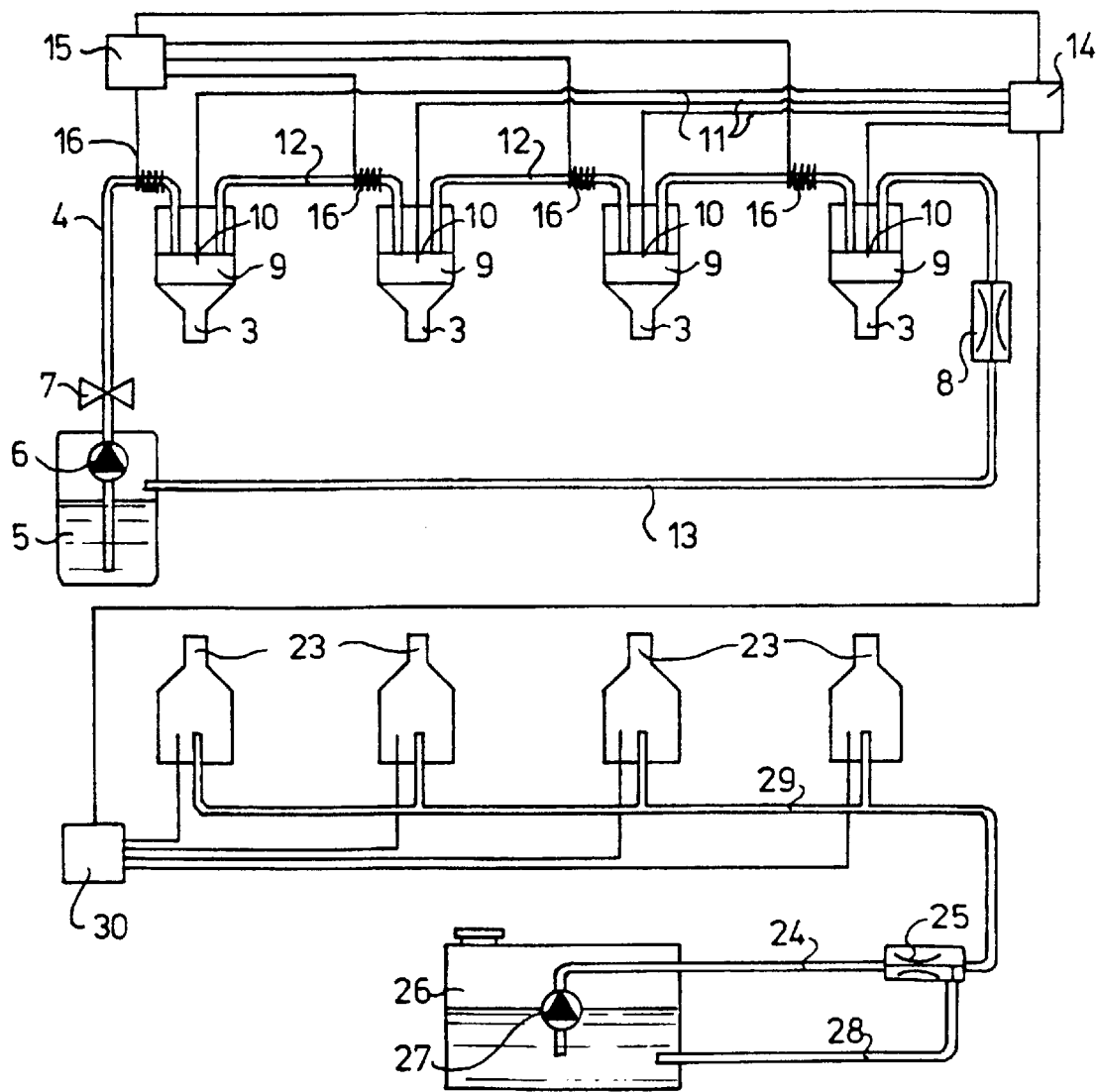

FUEL INJECTION DEVICE FOR AN INTERNAL COMBUSTION ENGINE

FIELD OF THE INVENTION

The present invention relates to a fuel injection device for an internal combustion engine according to the preamble of claim 1.

BACKGROUND OF THE INVENTION

Such a fuel injection device is generally known in the prior art. For example, an injection system for LPG is being marketed by Applicant under the name of LPI. The LPG in this case is in a liquid state during the injection and is not converted to vapour form until it is in the intake duct. Such a system has many advantages, such as negligible loss of power compared with petrol as the fuel, accurate metering possibilities and simple connection to electronics of electrically controlled petrol injection systems.

In order to ensure that the LPG used remains in the liquid state, a pump for increasing the pressure is used. Numerous measures are also taken to prevent heat transfer as much as possible from parts of the internal combustion engine to the supply/discharge pipes or injectors. The result of this is that liquid LPG can be guaranteed to be present in the injectors in all operating circumstances.

It has been found that injectors used inevitably show some leakage. This means that after the internal combustion engine has been switched off fuel goes into the intake manifold and makes starting more difficult. For the first part of the mixture which has been drawn in will contain excess fuel and ignite poorly, which gives rise to a risk of the spark plugs becoming fouled. This problem is particularly prevalent if the starting-up is on petrol. For during the first starting revolutions an excess of a mixture of vaporized LPG and petrol will be present, with the result that the petrol could well become deposited on the electrodes of the spark plugs.

This effect is a particular nuisance if the internal combustion engine is started up again a short time after being switched off. For if a longer period is allowed to elapse, the gaseous LPG will leak out of the system through the outlet or through other cylinders.

European Application 0,178,484 discloses an internal combustion engine which can run both on gas and on petrol. In this case LPG is introduced into the internal combustion engine in the liquid state.

U.S. Pat. No. 5,159,915 discloses an injector provided with a heating element. This injector is designed exclusively for running on petrol.

BRIEF SUMMARY OF THE INVENTION

It is the object of the present invention to provide a simple way of avoiding as far as possible the effect of leakage from the injectors for injecting liquid gas.

The invention is based on the idea that liquid will always leak on account of the fact that the injector always leaks slightly because of the optimum insulation and the increased pressure inside the injection system. This liquid (liquid LPG) expands by approximately a factor of 250. This means that the effect of the leakage is increased by a factor of 250. If the supply pipe is now heated during the switching-off, the liquid will pass into the vapour phase and most of it will be returned to the tank, and with the same leakage from the injector concerned 250 times less fuel will go into the cylinder. It has been found that starting problems then no longer occur.

Although the invention has been described above with reference to an LPG-driven engine, it should be understood that this principle can be used for any fuel which is relatively simple to convert from liquid phase to vapour phase. An example of the above is DME (dimethyl ether).

The supply pipes can be heated in any conceivable way. A particularly simple solution with the use of flexible pipes in particular is to have integrated therein an electric resistance heating coil. Its heating can be governed by a control mechanism. The injection system for the fuel such as LPG need not be changed any further.

With the design described above, only gaseous LPG will still be present in the pipes some time after the internal combustion engine has been switched off. It is not uncommon for such internal combustion engines to be started on petrol as indicated above. During this starting phase the injectors of the LPG injection system will remain closed, but the circulation pump present will still be functioning, in order to fill the system with liquid LPG and to discharge the heat in question which has been generated earlier. Obviously, at that stage the heating will no longer be in operation. The operating duration of the heating can be determined empirically in a simple manner, and in practice will last several minutes.

After the switch-over from petrol to LPG has been made, the pipes of the LPG system are flushed out, and the running can be continued in the usual way.

BRIEF DESCRIPTION OF THE DRAWINGS

The invention will be explained in greater detail below with reference to an exemplary embodiment illustrated in the drawing, in which:

FIG. 1 shows diagrammatically in side view a part of an internal combustion engine, and FIG. 2 shows the diagram of the various components of the device according to the invention.

DETAILED DESCRIPTION

An internal combustion engine is indicated by 1 in FIG. 1. This engine is illustrated only very diagrammatically and, as emerges from FIG. 2, in this case it is a four-cylinder engine. The intake duct is indicated by 2, and an injector 3 for liquid LPG and an injector 23 for petrol are fitted therein. All this is explained further with reference to FIG. 2.

It can be seen that injector 3 is connected by way of a pipe 4 and a pressure regulator 8—with the interposition of a valve 7 and a pump 6—to a tank 5 containing liquid LPG. Injector 3 is provided with a valve 9 which is operated by a coil 10 connected by way of a line 11 to the control mechanism 14. Pipe 12 is connected to pipe 4 and serves to supply the next injector 3 and to discharge excess LPG from the first injector 3 (one furthest left). This injector is designed in the same way, and the last injector 3 (one furthest right) is connected by way of a return pipe 13, in which a pressure regulator 8 is accommodated, to tank 5.

The supply pipes 4, 12 are provided near the injectors with an electrical resistance heating element 16, which is connected to a control mechanism 15.

Apart from this LPG injection system, a conventional petrol injection system is present. The latter consists of injectors 23 which are fitted on a fuel rail 29 which is connected by way of a pressure regulator 25 to a pump 27 by connecting a supply pipe 24 between them. A return pipe 28 is present and the above are fitted in a tank 26. The system is controlled by means of device 30, which is connected in a manner generally known in the prior art to control mechanism 14.

The device described above functions as follows:

During normal running the petrol injection device is not in operation. The same applies to the heating element 16.

If the internal combustion engine is switched off, the heating element 16 is operated by means of control mechanism 15 for a predetermined period of time. A time of 1 to 6 minutes, and more particularly 3 minutes, is mentioned as an example. This causes the temperature inside pipe 4 or 12 to increase, and the liquid LPG present therein vaporizes to vaporous LPG.

The pressure in the pipe system consequently increases and pressure regulator 8 will become active, and in this way the system is flushed clean, so that in the end only vaporous LPG is present in the pipes 4, 12 and 13. The leakage from the injectors which inevitably occurs on a small scale will then result only in the introduction of small quantities of vapour, so that when the internal combustion engine is first started up on petrol no inadmissible enrichment occurs.

When the internal combustion engine is first started up on petrol, insofar as applicable, control mechanism 15 will switch off heating element 16. Injectors 3 remain closed, while injectors 23 are active. However, pump 6 is active in order to introduce liquid LPG into the system and to remove the vaporous material. After a few seconds the switch-over from petrol to LPG can then be made, and normal running as described above can be resumed.

With the device described above the negative effects of leaking of the injectors is prevented, without it being necessary to use very expensive and complex injectors.

The electric heating element described above can be integrated in the flexible pipe. Only part of the pipes 4, 12 of such a heating system is included in the drawing, but it must be understood that the entire pipe can be heated.

These and further variants are obvious to the person skilled in the art after reading this description, and are within the scope of the appended claims.

What is claimed is:

1. Fuel injection device for an internal combustion engine, comprising at least an electrically operable fuel injector fitted on the intake duct or the cylinder head thereof, said injector being provided with a supply pipe for fuel, heating means being provided influenced by a control mechanism, whereby the supply pipe is provided with said heat ing means at least near said injector, wherein the control mechanism is designed to cause the heating means to heat the fuel for a certain period after the internal combustion engine has been switched off, and the injection device is designed for a fuel which is relatively simple to convert from the liquid phase to vapour phase.

2. Device according to claim 1, in which said injector comprises a discharge pipe and circulation pump for fuel.

3. Device according to claim 1, in which said heating means (16) comprise an electric heating element.

4. Device according to claim 3, in which said heating means comprise a resistance heating element integrated in the supply pipe.

5. Device according to claim 1, in which said certain period lies between 1 and 6 minutes.

6. Internal combustion engine comprising the fuel injection device according to claim 1, and a further fuel introduction device and control means.

7. Device according to claim 6, in which said control means are designed in such a way that during the starting-up of said internal combustion engine said further fuel introduction device functions for a first period while the injector of the fuel injection device remain closed, and that after that first period the fuel injection device functions when said further fuel introduction device is switched off.

8. Internal combustion engine according to claim 7, in which said injector comprises a discharge pipe and circulation pump for fuel, and during the operation of said further fuel introduction device the circulation pump is put into operation by said control means.

* * * * *